Figure 1:
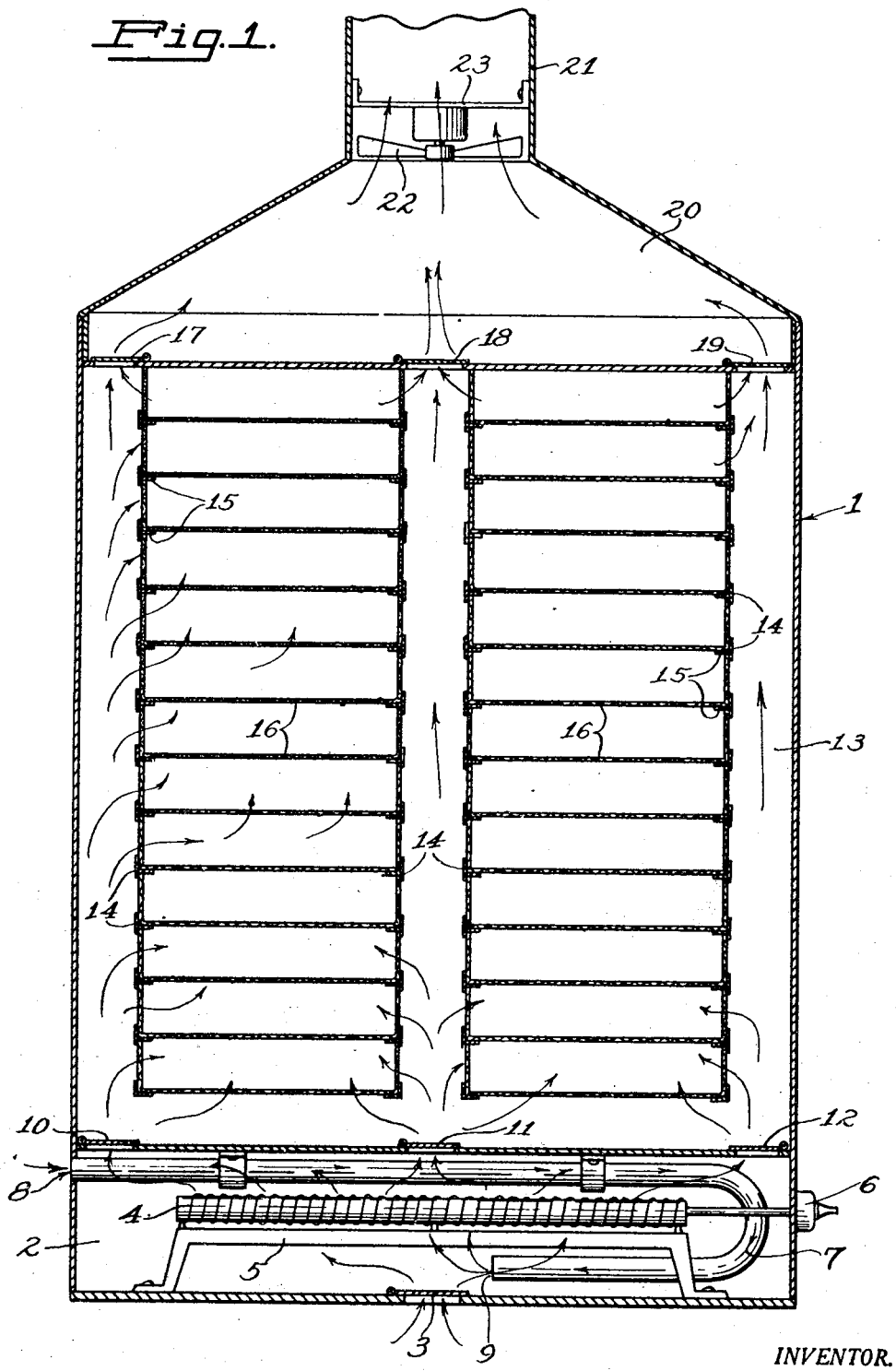

Oct. 2, 1928.

F. E. WHORFF

DEHYDRATING DEVICE

Filed Oct. 12, 1927

1,686,500

2 Sheets-Sheet 2

INVENTOR.
FREDERICK E. WHORFF.
BY
ATTORNEY

Patented Oct. 2, 1928.

1,686,500

UNITED STATES PATENT OFFICE.

FREDERICK E. WHORFF, OF MILL VALLEY, CALIFORNIA, ASSIGNOR OF ONE-FOURTH TO WILLIAM R. WHORFF, OF SAN FRANCISCO, CALIFORNIA.

DEHYDRATING DEVICE.

Application filed October 12, 1927. Serial No. 225,607.

The present invention relates to improvements in dehydrating devices, and more particularly to those adapted for fruit and vegetable drying, and has primarily for its object to provide a simple and efficient device of such character as will most nearly approach in perfection of results those obtained in open air drying where the action of sun and air is relied upon.

An additional object of the invention is to provide a dehydrating means of such design, simplicity of construction and cost of operation as will permit its use on smallest scale as a single unit, or upon a combination giving it such magnitude as to render it capable of meeting any and all demands.

In present practice, as is well known, reliance for dehydration is placed upon a blower for forcing the air through a heating medium and thence through the fruit-drying chamber, the heat here often reaching a temperature as high as 225 degrees Fahrenheit, and sometimes even exceeding this, temperatures calculated to "cook" the fruit, causing loss of essential qualities, rendering the dried product hard and necessitating after-treatments little likely to improve the article, either as to flavor or food value.

With the dehydrating means as here devised the air-currents are induced ones, the action being the reverse of that of the blast-created current resulting from the use of the blower, is gentler, more easily controlled and productive of decidedly more satisfactory results.

Though a fan is shown as a possible means for the creation of this induced upward current, in ordinary constructions a chimney is preferred for the creation of this draft, both on account of its cheapness and the moderation of the draft.

Fruits passing through this dehydrating process are found to be soft and unshrivelled, to have retained their sugars and flavors, and of such excellence, as to quality and appearance, as to require no after-treatment for the restoration of virtues lost through high temperatures and rapidly forced drying.

The air inlets and exits are so proportioned as to comparative areas as to provide for perfect draft, and the damper-controls of such nature as to permit of the diversion of the ascending air-current in any one of a number of directions, at the will of the attendant.

In consequence of the fruit in the trays nearest the bottom of the tiers being subjected to better drying conditions as to temperature and absence of air-humidity than those nearer the top, provisions are made enabling the position of individual trays to be shifted, that these conditions may be more nearly equalized.

In the smaller constructions, transparent fronts are provided, not as a necessity but as a convenience in viewing the interior of the drying chamber to note progress in the process, the time required in the drying varying from 24 to 36 hours, depending upon the nature and condition of the fruit, the character of the air as to dryness and temperature, and the perfection of movement of the ascending air-currents.

The device comprises three compartments, or chambers, in super-imposition as to arrangement, the first constituting the heating chamber, provided with a heating element of whatever character, an air preheater, and damper-controlled air-inlets; the second constituting the drying chamber, provided with tray-supporting means bearing, in tiers, wire-mesh trays adapted for individual shifting; and the third, constituting the air-exhaust chamber, into which the saturated air is delivered for removal to atmosphere by chimney draft, or other means.

Figure 2:
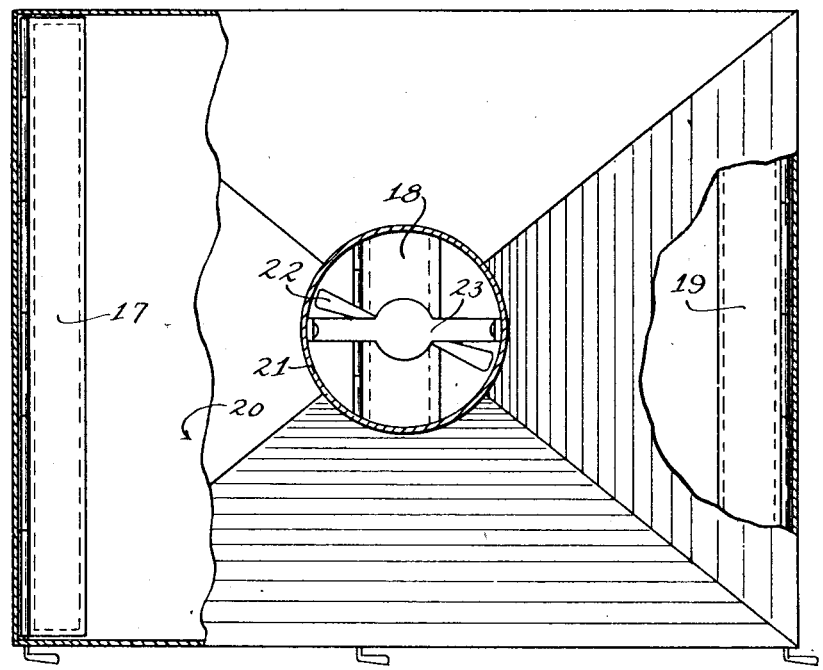
Figure 3:
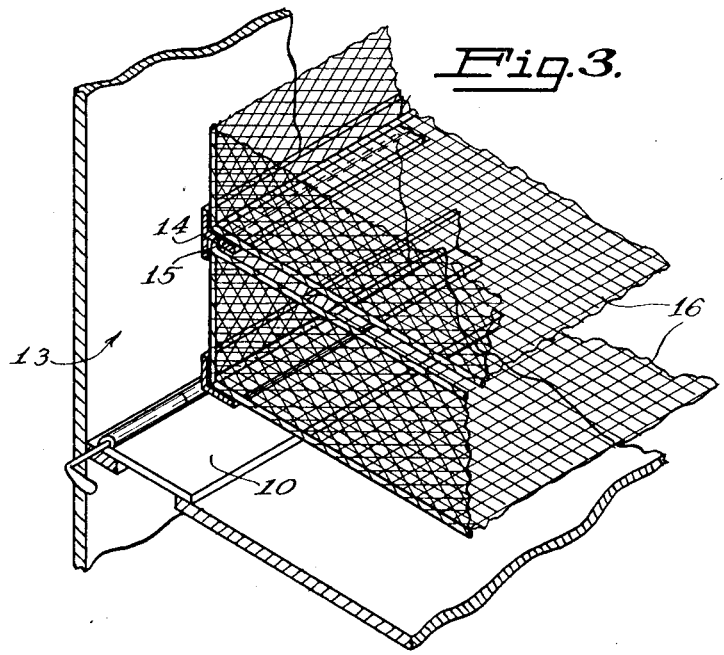

In the accompanying drawings, forming a part of this specification, and in which similar characters of reference refer to like parts, throughout:

Figure 1 is a front elevation of a preferred embodiment of my invention, in which is shown the air-heating chamber bearing interiorly an air-heating means and an air preheater and provided with damper-controlled air-inlets; a drying chamber provided interiorly with tray-supporting brackets bearing in tiers wire-mesh drying-trays; and an air-exhaust chamber provided with a chimney or other air-current inducing means:

Figure 2 is a top plan view of the air-exhaust chamber, showing the damper-controlled air-inlets thereinto, and air-exhaust means therefrom; and Figure 3 is a fragmentary view, in perspective, of the lower left corner of the device, showing a section of tray-tier and front.

Referring more particularly to the drawings, 1 represents in a general way the wall-structure and covering of the dehydrator, 2 the air-heating chamber, 3 the damper-controlled air-inlet through which cold air is admitted to this chamber for reducing when necessary the temperature of the heated air therein, 4 the air-heating element, 5 the supporting member for this element, 6 the electric switch controlling current to this element, 8 and 9 the air-inlet and air-outlet thereto and therefrom, 10, 11 and 12 the damper-controlled opening for the passage of heated air from the heating chamber into the drying chamber, 13 the interior of the drying chamber, 14 the fruit-tray supporting brackets borne interiorly by the walls of this chamber, of angle-iron character provided with webs 15 adapted for the slidable retention in tier-formation of the fruit-trays, 17, 18 and 19 damper-controlled openings for the escape of the saturated air from the drying chamber into the air-exhaust chamber, 21 the chimney connected with the air-exhaust chamber and functioning for the creation of an upward draft through the dehydrating structure, 22 a fan operable in conjunction with the chimney for producing an increased and accelerated draft, and 23 a supporting member for this fan borne by the chimney base.

The tray-tiers are arranged in spaced relation to the interior walls of the drying chamber and also to each other, a disposition affording an air space between tiers and walls and between tiers as well, thus permitting a free circulation of heated air about, around, above and below the individual trays constituting the tiers and insuring perfect dehydration of the fruit.

Though a wire-mesh tray construction has been shown in the drawings, it is not the intent to be thus restricted, as it is conceivable that other constructions might be more suitable for berry drying.

All dampers have been shown as closed, Figure 1, but it is obvious that these may be opened in such related combinations as to produce a diversity in air-current directions, as are partially indicated by the arrows of this figure.

All possibility of injuring the quality of the drying fruit through the admission to the dryer of excessively heated air is provided against in this device, since the air temperatures are regulable through the provisions of means admitting controlled volumes of cold air to the heating chamber to be commingled with the heated, assuring an equalized temperature never in excess of 150 degrees Fahrenheit, a temperature limitation within which conditions have been found best conductive to excellency of results.

Having thus described my invention, I claim, and desire to secure by Letters Patent:

In a dehydrating device of the character described, a drying chamber, an air-heating chamber and an air-exhaust chamber in damper-controlled communication respectively with said drying chamber, a heating unit interior said air-heating chamber, damper-controlled means leading from said last mentioned chamber to atmosphere, an air preheater leading from atmosphere to and through said heating chamber in juxtaposed relation with said unit and discharging therebeneath, and means for the control of the air admitted to said air preheater.

In testimony whereof, I hereby affix my signature.

FREDERICK E. WHORFF.